(12) United States Patent
Kobayashi (10) Patent No.: US 8,578,103 B2
(45) Date of Patent: Nov. 5, 2013

(54) COHERENCY CONTROL SYSTEM, COHERENCY CONTROL APPARATUS AND COHERENCY CONTROL METHOD

(75) Inventor: Kouji Kobayashi, Tokyo (JP)

(73) Assignee: NEC Corporation, Tokyo (JP)

(*) Notice: Subject to any disclaimer, the term of this patent is extended or adjusted under 35 U.S.C. 154(b) by 651 days.

(21) Appl. No.: 12/794,912

(22) Filed: Jun. 7, 2010

(65) Prior Publication Data

US 2011/0035531 A1 Feb. 10, 2011

(30) Foreign Application Priority Data

Jun. 8, 2009 (JP) .................................. 2009-136818

(51) Int. Cl.
*G06F 12/00* (2006.01)
*G06F 13/00* (2006.01)
*G06F 13/28* (2006.01)

(52) U.S. Cl.
USPC .......................................................... 711/141

(58) Field of Classification Search
None
See application file for complete search history.

(56) References Cited

U.S. PATENT DOCUMENTS

| | | | | |
|---|---|---|---|---|
| 6,574,698 B1* | 6/2003 | Dhong et al. | ..................... | 711/3 |
| 2005/0102473 A1* | 5/2005 | Sakata et al. | .................. | 711/122 |

FOREIGN PATENT DOCUMENTS

| | | | |
|---|---|---|---|
| JP | 64-18859 | A | 1/1989 |
| JP | 1-279342 | A | 11/1989 |
| JP | 3-216744 | A | 9/1991 |
| JP | 3-220644 | A | 9/1991 |
| JP | 4-174042 | A | 6/1992 |
| JP | 5-35592 | A | 2/1993 |
| JP | 5-265970 | A | 10/1993 |
| JP | 6-35801 | A | 2/1994 |
| JP | 10-283259 | A | 10/1998 |
| JP | 2005-509204 | A | 4/2005 |

OTHER PUBLICATIONS

Japanese Office Action for JP2009-136818 issued May 17, 2011.

\* cited by examiner

*Primary Examiner* — Christian P Chace
*Assistant Examiner* — Gary W Cygiel

(57) ABSTRACT

A coherency control system includes a logical-physical address translation unit which translates a logical address including a first tag and an index address into a physical address including a second tag and the index address. The system includes a request output unit which transmits a load request. The system includes a corresponding state storage unit storing a relation state between areas of two storage apparatuses based on the way number included in the load request and the second tag and the index address of the physical cal address also included in the load request. The system includes an invalidation instructing unit which transmits an invalidation instruction including the index address and the way number based on the second tag of the physical address included in the store request and the relation state stored in the corresponding state storage unit.

4 Claims, 13 Drawing Sheets

COHERENCY CONTROL SYSTEM, COHERENCY CONTROL APPARATUS AND COHERENCY CONTROL METHOD

This application is based upon and claims the benefit of priority from Japanese Patent Application No. 2009-136818, filed on Jun. 8, 2009, the disclosure of which is incorporated herein in its entirety by reference.

TECHNICAL FIELD

The present invention relates to a coherency control system, a coherency control apparatus and a coherency control method and, more particularly, to a coherency control system, a coherency control apparatus and a coherency control method which control coherency of a hierarchy memory.

BACKGROUND ART

As a technology which guarantees coherency of a cache that is one kind of hierarchy memories, various kinds of related technologies are known corresponding to a structure of a cache hierarchy and a structure of a system.

For example, technology related to a physical-logical address Translation Look-aside Buffer is disclosed in Japanese Patent Application Laid-Open No. 1998-283259. An information-processing unit of Japanese Patent Application Laid-Open No. 1998-283259 has a physical address array including a logical page address tag. When the content of a main memory is changed and the physical address of the changed part is notified, the information-processing unit generates a logical address from this physical address by the physical address array. Further, the information-processing unit performs invalidation processing of a level one cache based on the generated logical address.

SUMMARY

An exemplary object of the present invention is to provide a coherency control system, a coherency control apparatus and a coherency control method capable of guaranteeing coherency of a hierarchy memory by suppressing increase of latency and bus traffic when accessing the hierarchy memory without increasing the hardware volume.

A coherency control system according to an exemplary aspect of the invention includes a logical-physical address translation unit which translates a logical address including a first tag, an index address and an offset address of a first storage unit of a set associative system into a physical address of a second storage unit, the physical address including a second tag, the index address and the offset address, a request output unit which transmits a load request including at least the physical address and a way number of a way to which an area of the first storage unit designated by the logical address corresponding to the physical address belongs, a corresponding state storage unit which stores a relation state between an area of the second storage unit and an area of the first storage unit based on the way number included in the load request which has been received and the second tag and the index address of the physical address also included in the load request which has been received, and an invalidation instructing unit which receives a store request including the physical address, and transmits an invalidation instruction including the index address and the way number based on the second tag of the physical address included in the store request which has been received and the relation state stored in the corresponding state storage unit.

A coherency control apparatus according to an exemplary aspect of the invention includes a corresponding state storage unit which stores, based on a received load request including a physical address of a second storage unit which is translated from a logical address including a first tag, an index address and an offset address of a first storage unit of a set associative system and which includes a second tag, the index address and the offset address, and a way number of a way to which an area of the first storage unit designated by the logical address corresponding to the physical address belongs, a relation state between an area of the second storage unit and an area of the first storage unit based on the way number included in the load request and the second tag and the index address of the physical address also included in the load request, and an invalidation instructing unit which receives a store request including the physical address, and transmits an invalidation instruction including the index address and the way number based on the second tag of the physical address included in the store request which has been received and the relation state stored in the corresponding state storage unit.

A coherency control method according to an exemplary aspect of the invention includes translating a logical address including a first tag, an index address and an offset address of a first storage unit of a set associative system into a physical address of a second storage unit, the physical address including a second tag, the index address and the offset address, transmitting a load request including at least the physical address and a way number of a way to which an area of the first storage unit designated by the logical address corresponding to the physical address belongs, storing a relation state between an area of the second storage unit and an area of the first storage unit based on the way number included in the load request which has been received and the second tag and the index address of the physical address also included in the load request which has been received, and receiving a store request including the physical address, and transmitting an invalidation instruction including the index address and the way number based on the second tag of the physical address included in the store request which has been received and the stored relation state.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will be described in detail with reference to a drawing.

Figure 1:
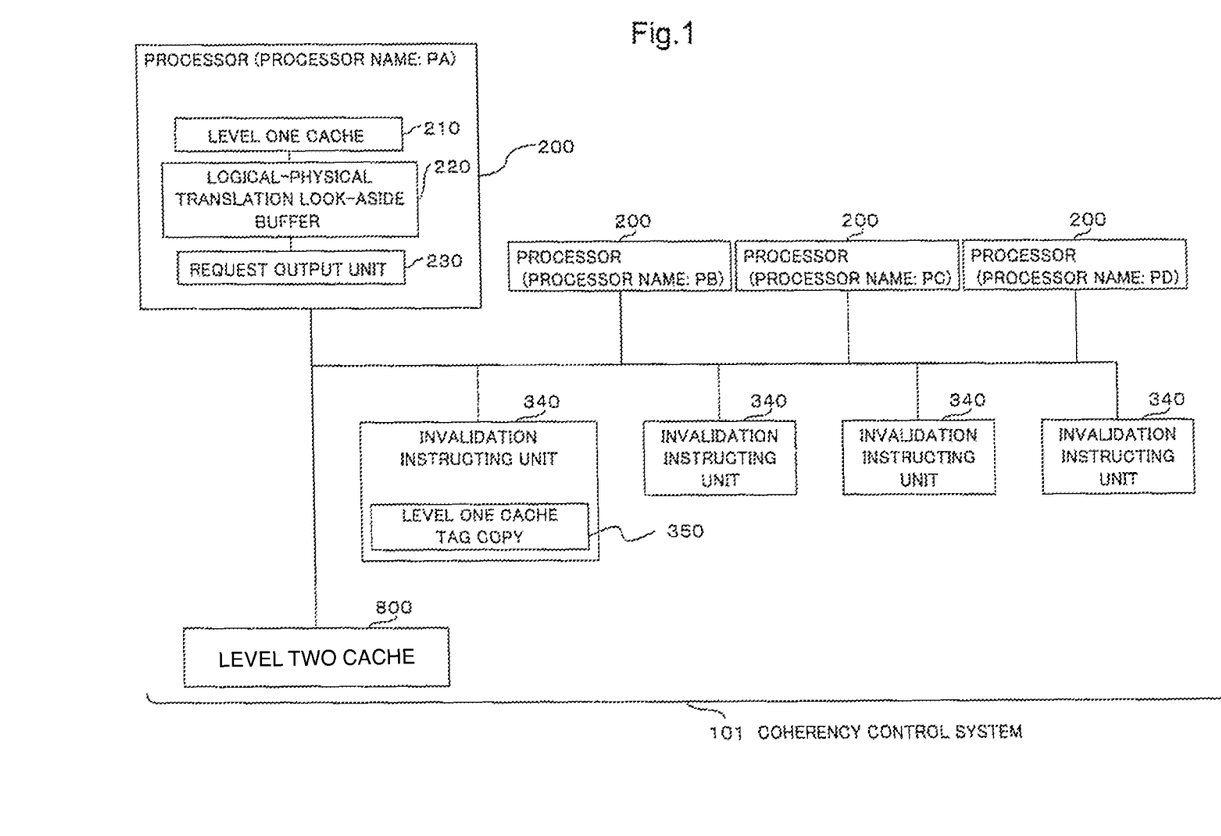
FIG. 1 is a block diagram showing a structure of the first exemplary embodiment.

FIG. 1 is a block diagram showing a structure of the first exemplary embodiment. Referring to FIG. 1, coherency control system 101 according to this exemplary embodiment includes a plurality of processor 200s, a plurality of invalidation instructing unit 340s and level two cache (it is also called a second storage unit) 800.

Each processor 200 includes level one cache (it is also called a first storage unit) 210, logical-physical Translation Look-aside Buffer (it is also called a logical-physical address translation unit) 220 and request output unit 230. Each processor 200 is given a processor name (it is also called an identifier of a processor) as shown in FIG. 1 in advance. Meanwhile, when each processor 200 needs to be distinguished in the following description, processor 200 having processor name PA, for example, is indicated as processor PA 200.

Figure 2:
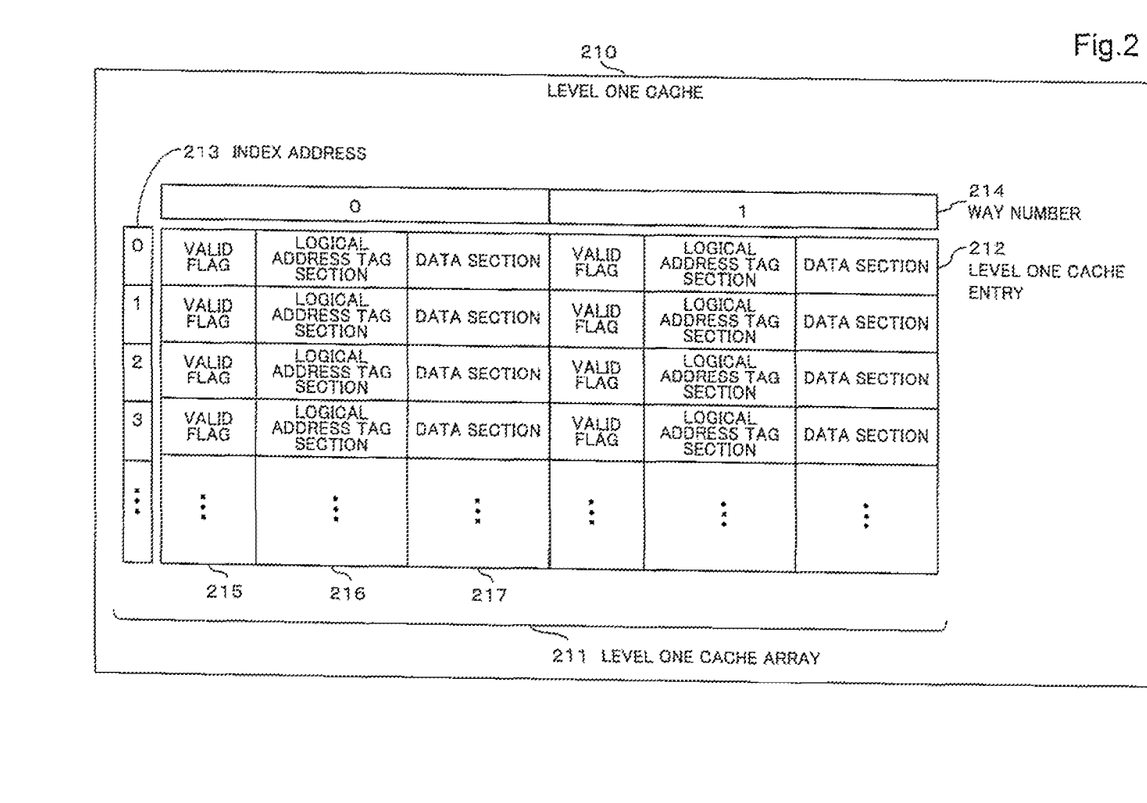
FIG. 2 is a diagram showing a structure of a level one cache array in the first to third exemplary embodiments.

Level one cache 210 is a cache which is of a 2-ways set associative system and a write-through cache structure, for example, and is managed using logical address 601 mentioned later. Level one cache 210 has level one cache array 211 as shown in FIG. 2. Level one cache array 211 has a plurality of level one cache entries (it is also called an area of the first storage unit) 212s including valid flag 215, logical address tag section 216 which holds a logical address tag and data section 217 which holds data. Here, valid flag 215 is a flag which shows whether corresponding level one cache entry 212 is valid or invalid. Each level one cache entry 212 is identified uniquely by index address 213 and way number 214.

Level one cache 210 changes valid flag 215 of level one cache entry 212 which is determined based on an invalidation instruction (it is mentioned later) and an invalidation index address (it is also mentioned rater) which have been received into the invalid state.

Note that, a structure of level one cache 210 is not limited to a 2-ways set associative system, and it may be an N (N is an integer of no less than 2)-ways set associative system.

Figure 3:
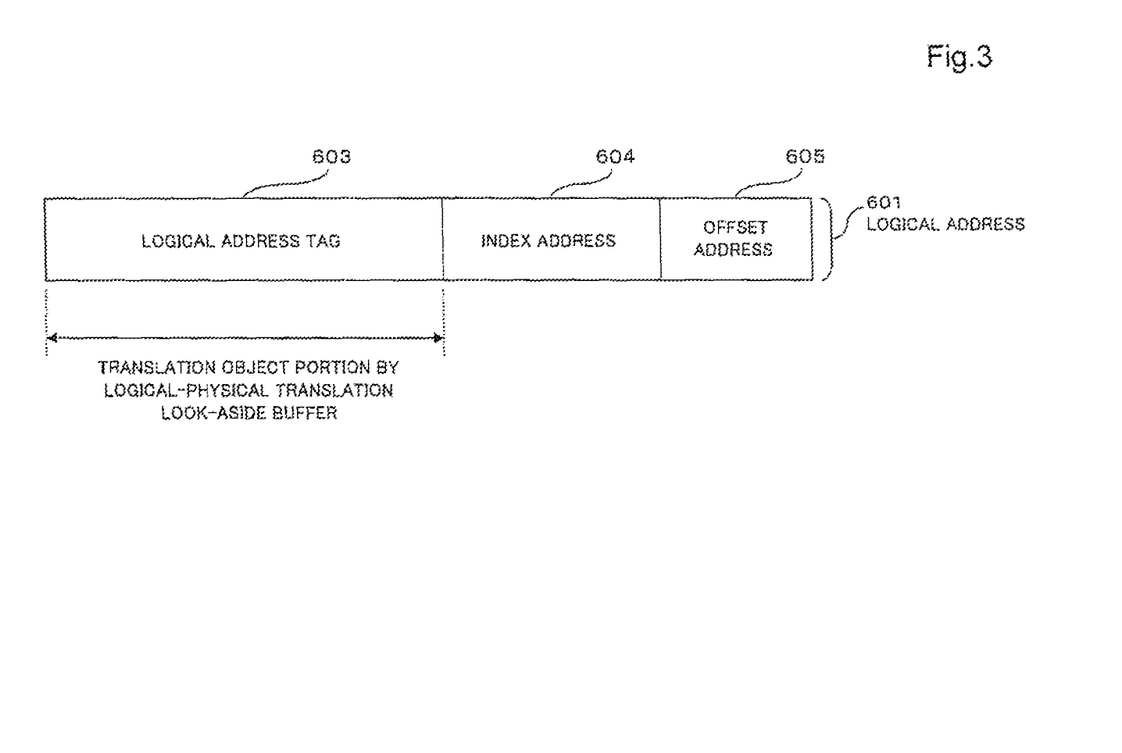
FIG. 3 is a diagram showing a structure of a logical address in the first to third exemplary embodiments.
Figure 4:
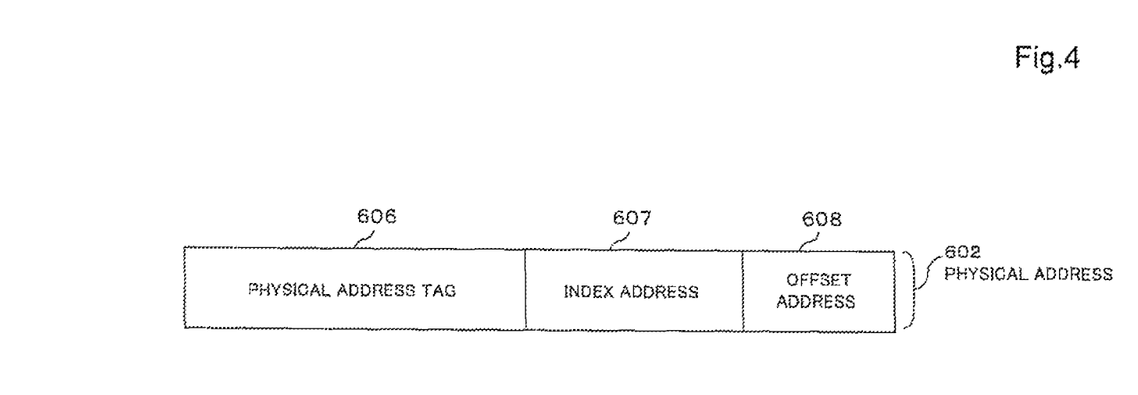
FIG. 4 is a diagram showing a structure of a physical address in the first to third exemplary embodiments.

Logical-physical Translation Look-aside Buffer 220 converts logical address 601 as shown in FIG. 3 into physical address 602 as shown in FIG. 4. Logical address 601 includes logical address tag (it is also called a first tag) 603 of level one cache 210, index address 604 and offset address 605. Physical address 602 includes physical address tag (it is also called a second tag) 606, index address 607 and offset address 608. In conversion by logical-physical Translation Look-aside Buffer 220, numerical values of index address 604 and offset address 605 are used as values of index address 607 and offset address 608 just as it is, respectively.

Request output unit 230 transmits a load request including physical address 602 and way number 214 related to this physical address 602. Here, such way number 214 related to this physical address 602 is, when it is assumed that the numerical value of logical address tag 603 included in logical address 601 corresponding to physical address 602 is "LAT1", way number 214 of a way which belongs to level one cache entry 212 including logical address tag section 216 which holds the identical numerical value "LAT1".

Request output unit 230 transmits a store request including physical address 602.

Figure 5:
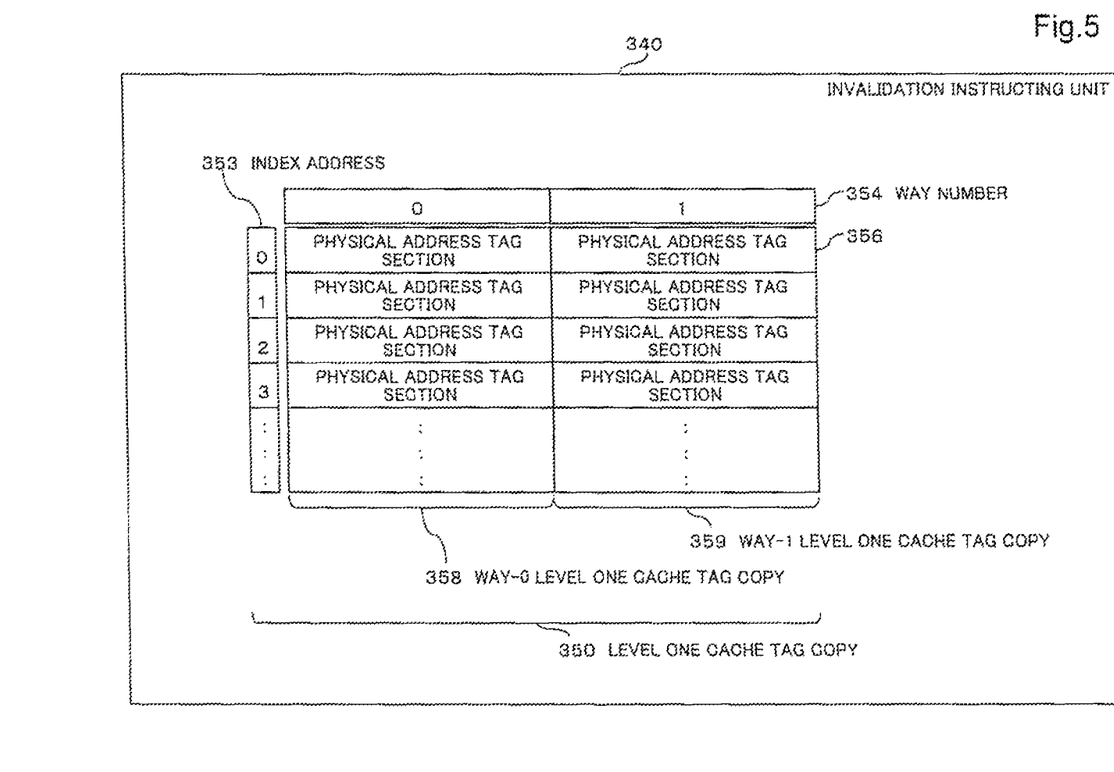
FIG. 5 is a diagram showing a structure of a level one cache tag copy in the first exemplary embodiment.

Invalidation instructing unit 340 includes level one cache tag copy (it is also called a corresponding state storage unit) 350 as shown in FIG. 5. Meanwhile, invalidation instructing unit 340 including level one cache tag copy 350 may be called a coherency control apparatus.

Level one cache tag copy 350 has way-0 level one cache tag copy 358 including a plurality of physical address tag section 356s and way-1 level one cache tag copy 359 which also includes a plurality of physical address tag section 356s. Each physical address tag section 356 is identified by index address 353 and way number 354 uniquely.

Invalidation instructing unit 340 receives the load request and writes physical address tag 606 included in the received load request to the area of level one cache tag copy 350 which has been determined based on index address 607 and way number 214 which are also included in the received load request. That is, when physical address tag 606 corresponding to the contents of logical address tag section 216 and index address 213 include the same numerical values of the contents of physical address tag section 356 and index address 353 respectively, invalidation instructing unit 340 processes a load request so that the area of level one cache 210 determined according to these and an area of level two cache 800 may correspond each other.

Level two cache 800 is a cache which is managed using a level two physical address and is shared by a plurality of processor 200s. Note that, although the whole numerical value of a level two physical address is same as the whole numerical value of physical address 602, but different in its structure. For example, the bit width of the index address of a level two physical address and the bit width of index address 607 do not need to be identical, and the bit width of the offset address of a level two physical address and the bit width of offset address 608 do not need to be identical also.

Also, invalidation instructing unit 340 detects sameness between physical address tag 606 which is included in a received store request and either one of the contents of physical address tag section 356s within level one cache tag copy 350 which correspond to index address 353 designated by the numerical value of index address 607 which is also included in the received store request. When this sameness is detected, invalidation instructing unit 340 transmits an invalidation instruction corresponding to index address 353 and way number 354 as an invalidation index address.

Meanwhile, as mentioned above, level one cache 210 which has received this invalidation instruction recognizes an invalidation index address received simultaneously as index address 213 of level one cache entry 212 which is invalidated.

Next, operation of invalidation instructing unit 340 will be described in detail with reference to FIG. 6.

Figure 6:
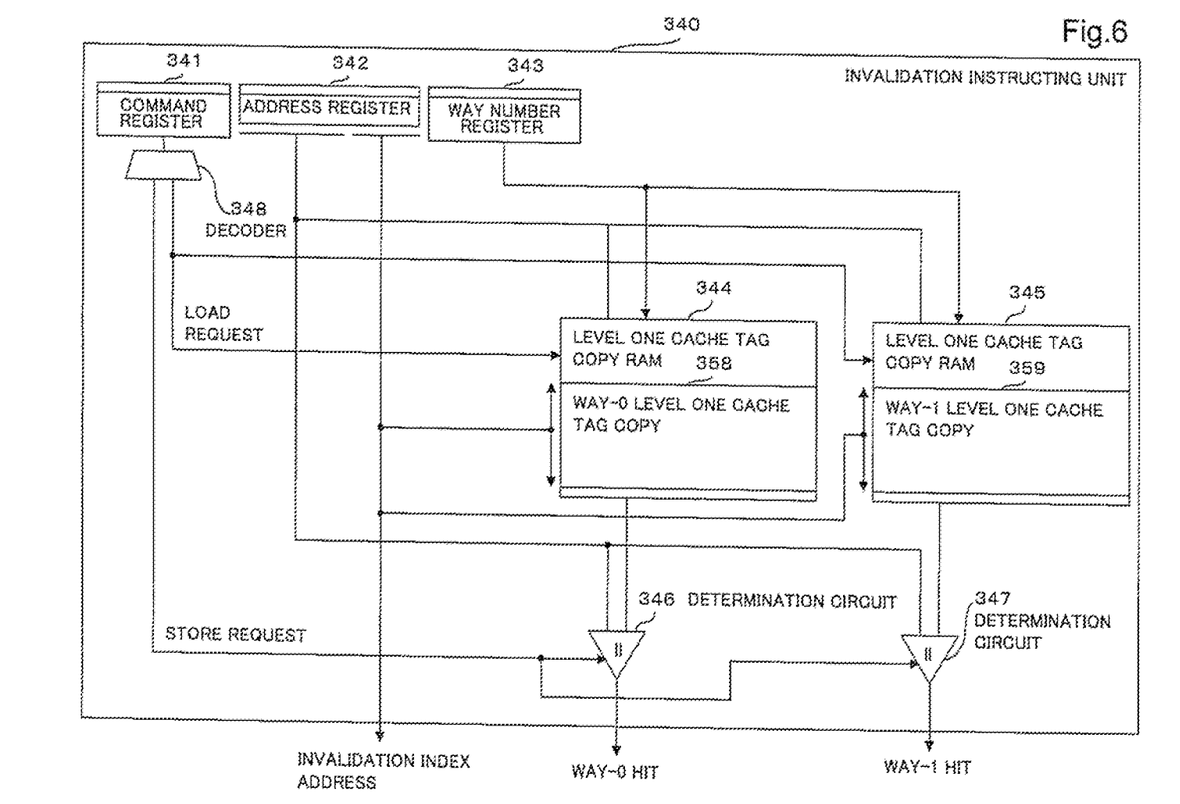
FIG. 6 is a block diagram showing a structure of an invalidation instructing unit in the first exemplary embodiment.

Referring to FIG. 6, invalidation instructing unit 340 includes command register 341, address register 342, way number register 343, decoder 348, level one cache tag copy RAM (Random Access Memory) 344, level one cache tag copy RAM 345, determination circuit 346 and determination circuit 347.

Level one cache tag copy RAM 344 and level one cache tag copy RAM 345 store way-0 level one cache tag copy 358 and way-1 level one cache tag copy 359 of level one cache tag copy 350 shown in FIG. 5, respectively.

First, processing of a load request, that is, operation when writing level one cache tag copy 350 will be described.

As it has been mentioned above, level one cache 210 is of a write through cache structure. Accordingly, at the time of opening level one cache entry 212, request output unit 230 transmits a load request to level two cache 800 which is a shared cache. Request output unit 230 transmits this load request including way number 214 of level one cache entry 212 which is to be validated among two ways of level one cache array 211.

In invalidation instructing unit 340, when a load request is received, command register 341 holds information (a command code, for example) which indicates that it is a load request. At the same time, address register 342 holds physical address 602. Further, Way number register 343 holds way number 214.

Next, decoder 348 outputs a load request signal.

Then, each of level one cache tag copy RAM 344 and level one cache tag copy RAM 345 determines selection or non-selection according to way number 214 held in way number register 343. After that, level one cache tag copy RAM 344 or level one cache tag copy RAM 345 which has determined selection selects one of a plurality of index address 353s according to index address 607 held in address register 342. Then, level one cache tag copy RAM 344 or level one cache tag copy RAM 345 which has determined selection stores physical address tag 606 held by address register 342 in physical address tag section 356 of selected index address 353.

Next, processing for a store request, that is, operation when outputting an invalidation instruction will be described.

In invalidation instructing unit 340, when a store request is received, command register 341 holds information (a command code, for example) which indicates that it is a store request. At the same time, address register 342 holds physical address 602.

Next, decoder 348 outputs a store request signal.

Each of level one cache tag copy RAM 344 and level one cache tag copy RAM 345 performs selection of one of a plurality of physical address tag section 356s according to index address 607 held in address register 342.

Then, determination circuit 346 and determination circuit 347 perform comparative determination of the contents of physical address tag section 356s selected respectively according to the store request signal and physical address tag 606 held in address register 342. Following the above, when the contents of physical address tag section 356 and physical address tag 606 are identical, determination circuit 346 and determination circuit 347 transmit a way-0 hit signal and a way-1 hit signal respectively as an invalidation instruction. At the same time, invalidation instructing unit 340 transmits index address 607 held in address register 342 as an invalidation index address.

The effect in this exemplary embodiment mentioned above is that it is possible to guarantee coherency of a level one cache while suppressing increase of latency of level one cache access, increase of bus traffic and increase of the hardware volume.

The reason of this is that an invalidation instructing unit is constructed such that it writes a physical address tag included in a load request in an area of a level one cache tag copy which has been determined based on a physical address translated without changing the index address section of a logical address and a way number, and transmits an invalidation instruction to a level one cache based on the level one cache tag copy.

Next, the second exemplary embodiment will be described in detail with reference to the drawings.

The first exemplary embodiment mentioned above is of a structure in which level two cache 800 includes level one cache tag copy 350 so that it may be operable even when it is in non-inclusion relation with level one cache 210. On the other hand, the present exemplary embodiment is an exemplary embodiment which premises that level two cache 810 (it is mentioned later) includes the content of level one cache 210, and which is of a simple structure compared with the first exemplary embodiment.

Figure 7:
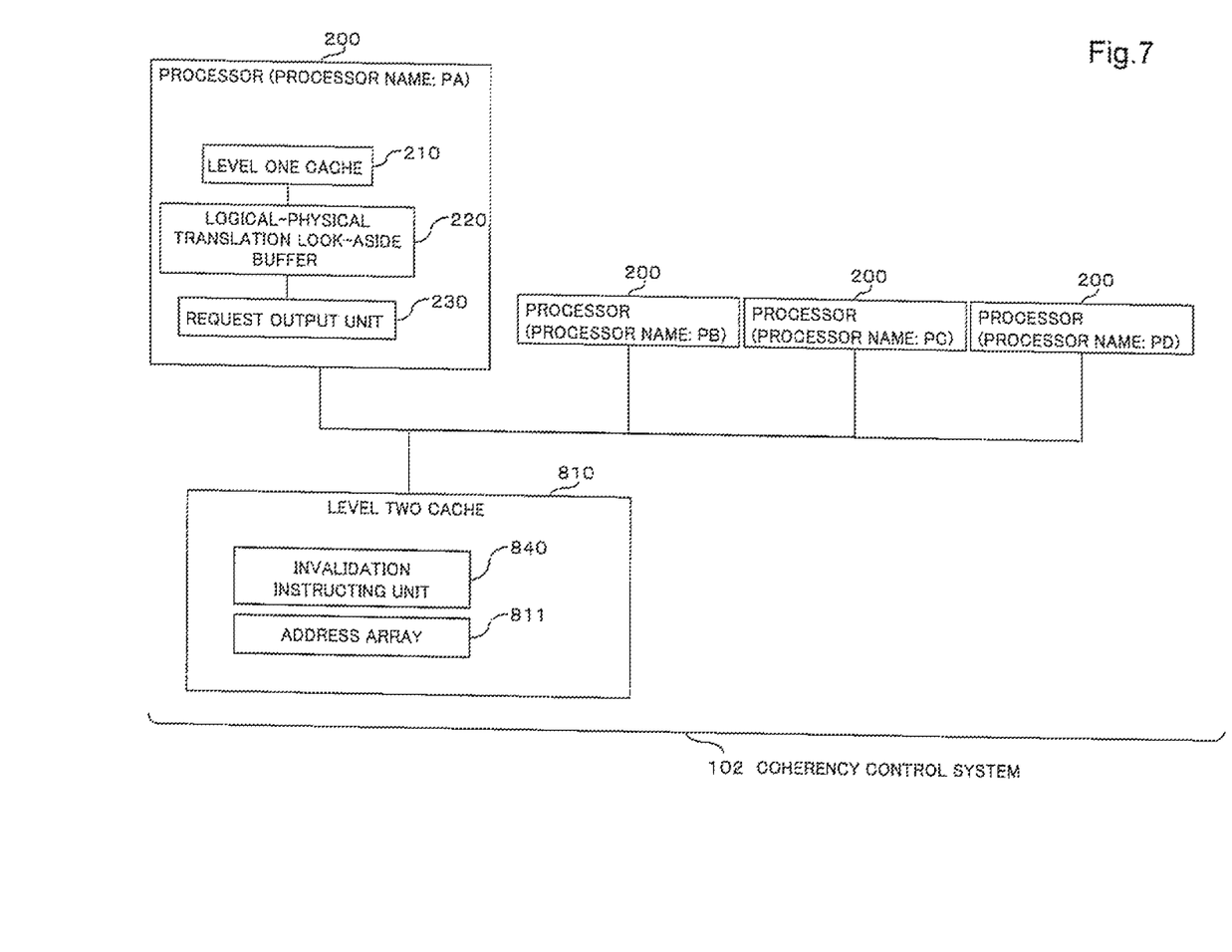
FIG. 7 is a block diagram showing a structure of the second exemplary embodiment.

FIG. 7 is a block diagram showing a structure of the second exemplary embodiment. Referring to FIG. 7, coherency control system 102 according to this exemplary embodiment includes a plurality of processor 200s and level two cache 810.

Processor 200 includes the same composition and functions as processor 200 of the first exemplary embodiment.

Level two cache (it is also called an area of a second storage unit) 810 is a cache which is managed using a level two physical address and is shared by a plurality of processor 200s.

Figure 8:
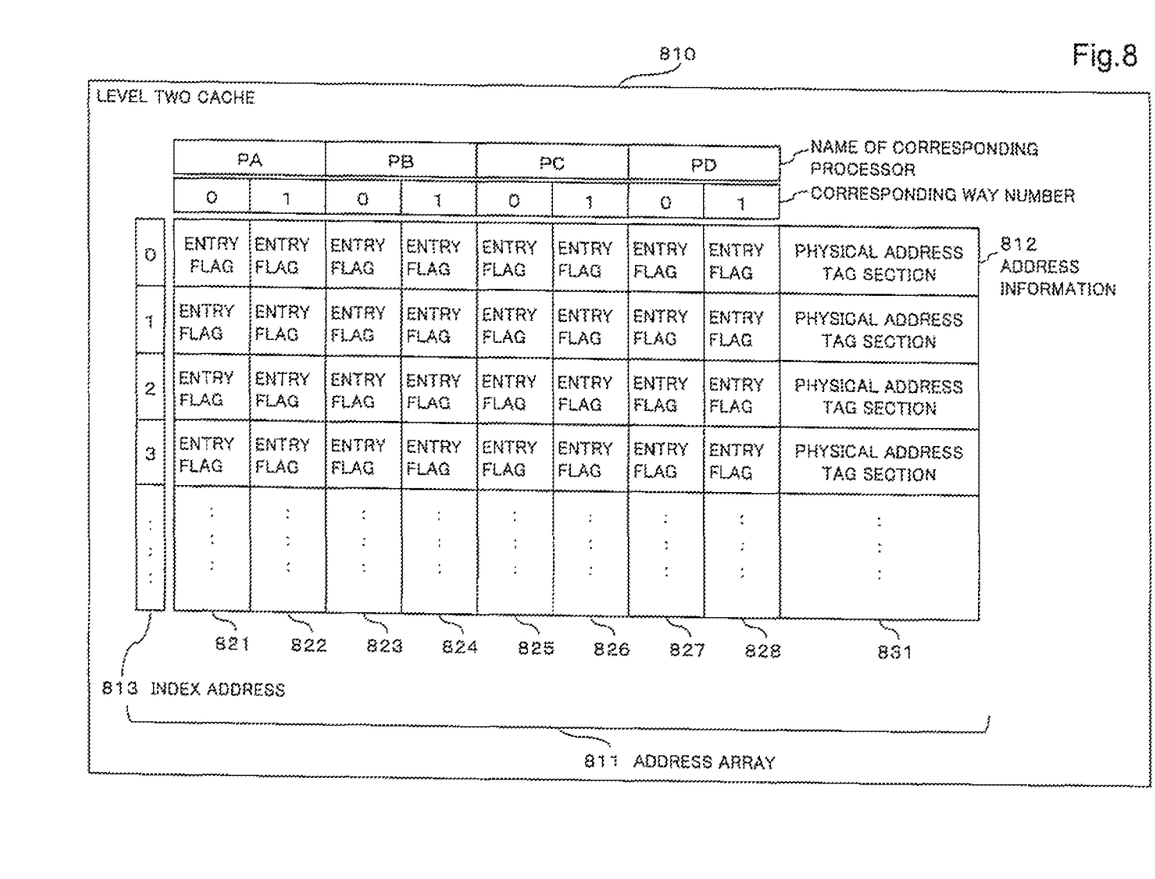
FIG. 8 is a diagram showing a structure of an address array in the second exemplary embodiment.

Level two cache 810 includes address array (it is also called a corresponding state storage unit) 811 as shown in FIG. 8 and invalidation instructing unit 840. Address array 811 and invalidation instructing unit 840 may be called a coherency control apparatus all together.

Address array 811 includes a plurality of pieces of address information 812 correlated to index address 813. Each address information 812 includes entry flags 821-828 and physical address tag section 831.

Entry flags 821-828 are information which indicates that in which way of level one cache 210 level one cache entry 212 related to a corresponding entry of level two cache 810 is being opened. Each of entry flags 821-828 corresponds to each way number 214 of level one cache 210 of each processor 200, respectively. For example, when level one cache entry 212 related to an entry of level two cache 810 is being validated; it is supposed that corresponding entry flags 821-828 are set to "1".

Invalidation instructing unit 840 selects address information 812 according to the content of physical address tag section 831 and index address 813 which correspond to physical address tag 606 and index address 607 which are included in a received load request, respectively. Successively, invalidation instructing unit 840 selects one of entry flags 821-828 of the selected address information 812 based on way number 214 which is included in a received load request and the processor name of processor 200 that is the sender of the load request. Further, invalidation instructing unit 840 sets the selected one of entry flags 821-828 to "1".

Invalidation instructing unit 840 selects address information 812 according to the contents of physical address tag section 831 and index address 813 which correspond to physical address tag 606 and index address 607 which are included in a received store request, respectively. Then, invalidation instructing unit 840 detects entry flags 821-828 which are set to "1" among entry flags 821-828 of selected address information 812. Next, invalidation instructing unit 840 transmits to processor 200 corresponding to detected entry flags 821-828 an invalidation instruction corresponding to way number 214 corresponding also to detected entry flags 821-828 and index address 813 of selected address information 812 as an invalidation index address.

The effect in this exemplary embodiment mentioned above is that, in addition to the effect of the first exemplary embodiment, when a level two cache is in inclusion relation with a level one cache, it can enable to further reduce the hardware volume.

The reason is that a physical address tag, an index address and a way number are made stored in an address array of a level two cache in a manner they are associated each other.

Next, the third exemplary embodiment will be described in detail with reference to a drawing. This exemplary embodiment is an exemplary embodiment including only basic elements.

Figure 9:
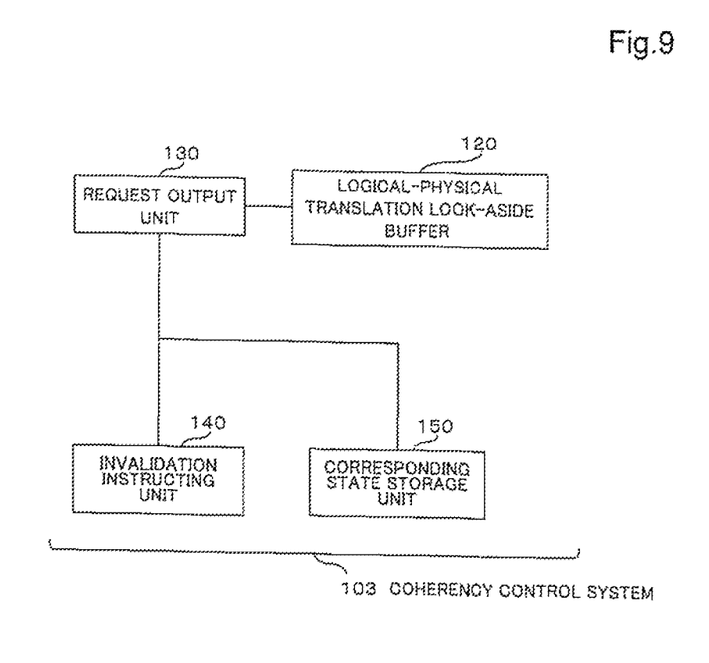
FIG. 9 is a block diagram showing a structure of the third exemplary embodiment.

FIG. 9 is a block diagram showing a structure of this exemplary embodiment. Referring to FIG. 9, coherency control system 103 according to this exemplary embodiment includes logical-physical Translation Look-aside Buffer 120, request output unit 130, invalidation instructing unit 140 and corresponding state storage unit 150. Meanwhile, invalidation instructing unit 140 and corresponding state storage unit 150 may be called a coherency control apparatus as a whole.

Logical-physical Translation Look-aside Buffer 120 includes the same structure and functions as the first logical-physical Translation Look-aside Buffer 220.

Request output unit 130 includes the same structure and functions as the first request output unit 230.

Corresponding state storage unit 150 stores a corresponding state between an entry of a level two cache and level one cache entry 212 while correlating physical address tag 606, index address 607 and way number 214 based on a received load request.

Invalidation instructing unit 140 transmits index address 607 and an invalidation instruction corresponding to way number 214 to a level one cache based on physical address tag 606 which is included in a received store request and the content stored in corresponding state storage unit 150.

The effect in this exemplary embodiment mentioned above is that coherency of a level one cache can be guaranteed while suppressing increase of latency of level one cache access, increase of bus traffic and increase of the hardware volume.

The reason is that it is constructed such that a physical address tag, an index address and a way number are stored in the side of a level two cache in a manner they are correlated each other based on a physical address which has been converted without changing the index address section of a logical address and the way number, and an invalidation instruction is transmitted to a level one cache based on a level one cache tag copy.

On the other hand, in the related technology mentioned above and the technology disclosed by the preceding technical documents, when trying to guarantee coherency by suppressing bus traffic without increasing latency of level one cache accesses from an instruction execution unit, there is a problem that the hardware volume becomes large.

The reason will be described below.

For example, in a multiprocessor system having a level one cache installed in each processor and a level two cache shared by a plurality of processors as a plurality of levels of caches, a method for mapping a level one cache by a physical address is used.

Figure 10:
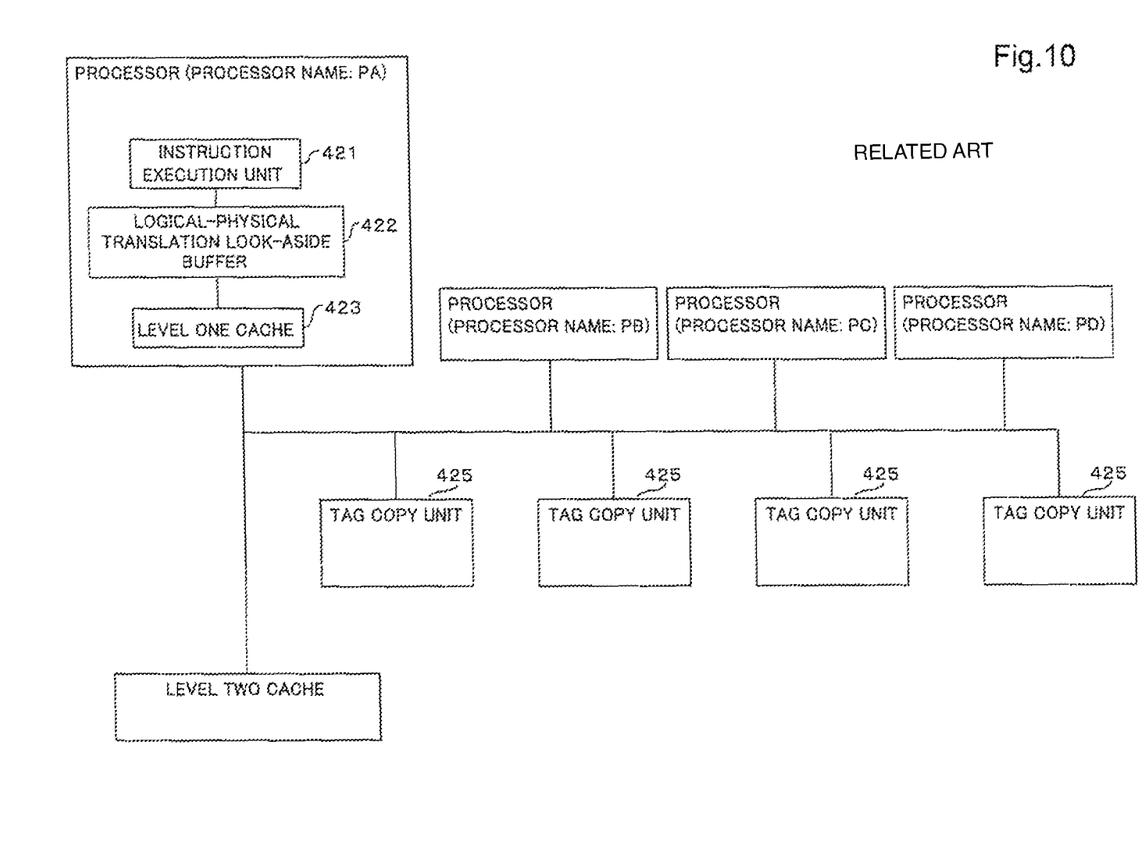
FIG. 10 is a block diagram showing a structure of a multiprocessor system of the related art.

FIG. 10 is a diagram showing a structure, in such multiprocessor system, when level one caches and a level two cache are not in inclusion relation. Tag copy unit 425, using a copy of a tag of a level one cache, instructs a corresponding level one cache to perform invalidation processing based on a physical address included in a store request by another processor.

Figure 11:
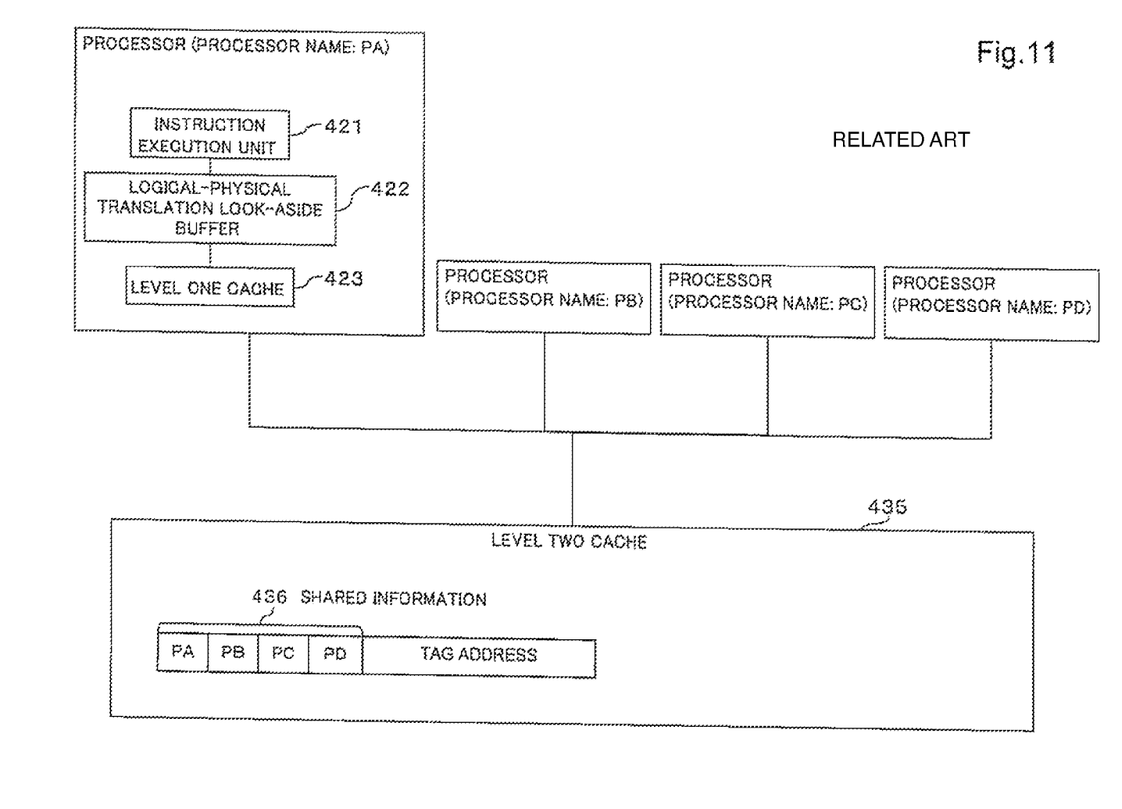
FIG. 11 is a block diagram showing a structure of a multi-processor system of the related art.

FIG. 11 is a diagram showing a structure, in a similar multiprocessor system, when level one caches and a level two cache are in inclusion relation in which the level two cache includes data of the level one caches. Level two cache 435 includes shared information section 436 in a tag section and holds information about which processor is caching a corresponding line. A control unit of a level two cache instructs a corresponding level one cache to perform invalidation processing based on the content of this common information section.

However, in a method in which a level one cache is mapped using a physical address as mentioned above, there is a problem that access latency is large because processing by logical-physical address Translation Look-aside Buffer 422 is needed when instruction execution unit 421 accesses level one cache 423.

As measures to such problem, there is a method in which a level one cache is mapped by a logical address and a physical address tag arranged in a level one cache is used.

Figure 12:
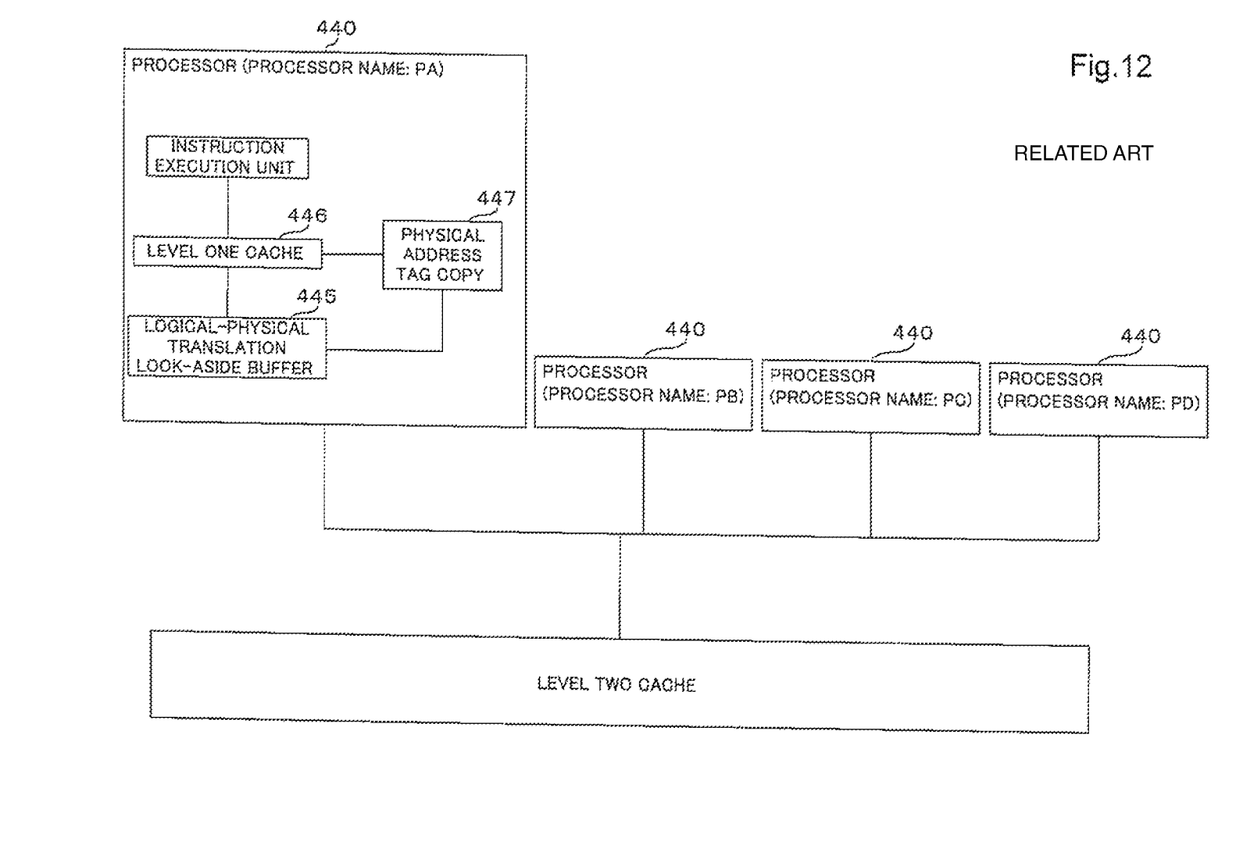
FIG. 12 is a block diagram showing a structure of a multi-processor system of the related art.

FIG. 12 is a diagram showing a structure when a physical address tag of a level one cache is arranged in a processor. For example, when a store request is received from processor PB 440, processor PA 440 refers to physical address tag copy 447 of processor PA 440 and performs searching whether a physical address tag included in a store request gets a hit or mishit. When a load request is issued from level one cache 446 and logical-physical address translation is carried out in logical-physical Translation Look-aside Buffer 445A, physical address tag is registered with an entry of physical address tag copy 447 corresponding to an entry of a level one cache. And when the physical address tag of a store request hits any one of entries of physical address tag copy 447, processor PA 440 invalidates the corresponding entry of the level one cache.

However, because, whenever each processor issues a store request, this method transmits such store request to the other processors, there is a problem that bus traffic becomes large and the power consumption also becomes large.

Figure 13:
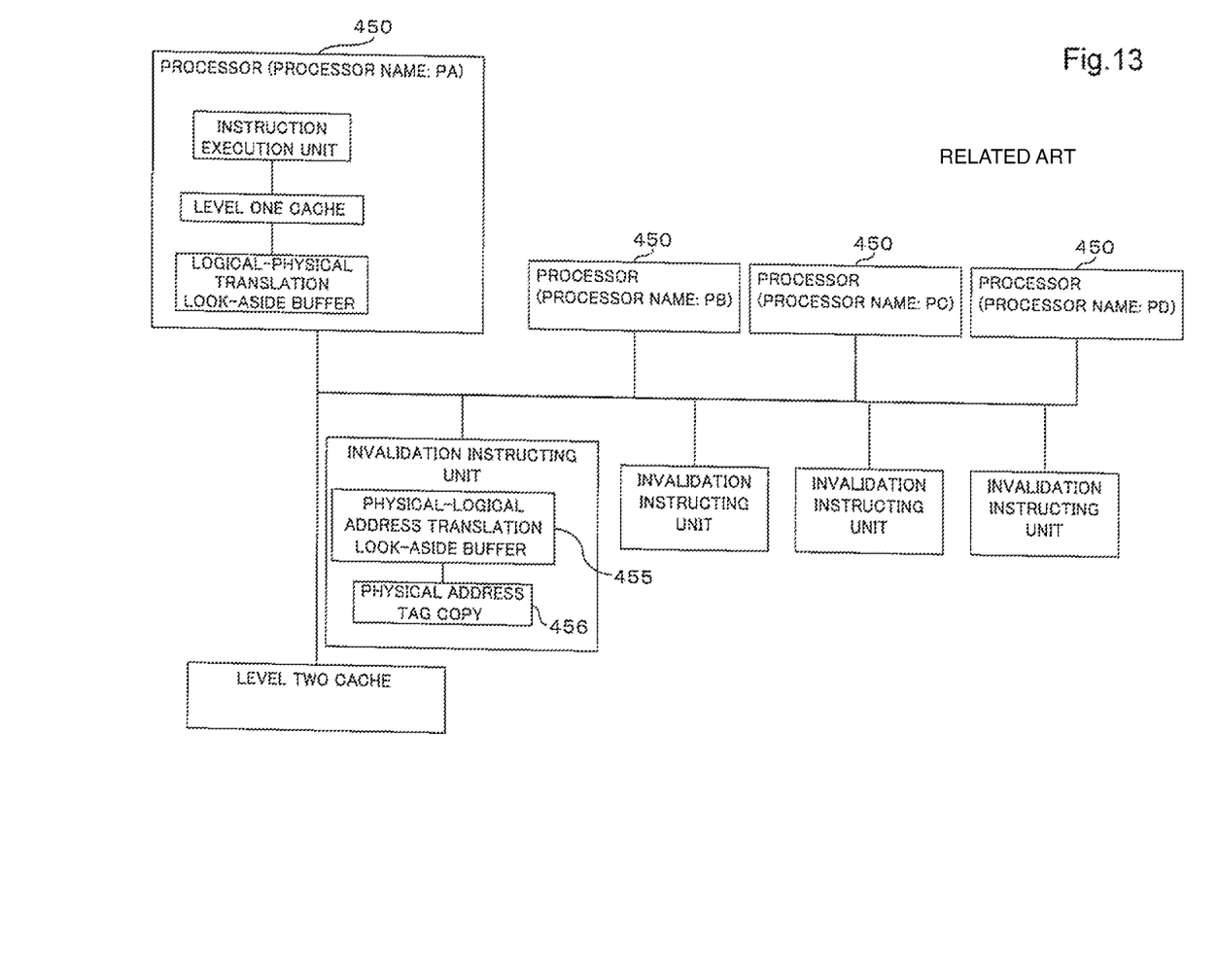
FIG. 13 is a block diagram showing a structure of a multi-processor system of the related art.

As another measure to the problem mentioned above, there is a method in which a level one cache is mapped using a logical address, and a logical address is generated based on a physical address tag arranged in the level two cache side. FIG. 13 is a diagram showing a structure in which physical address tag copy 456 and physical-logical address Translation Look-aside Buffer 455 corresponding to each processor 450 are arranged in the level two cache side.

As mentioned above, after all, in order to settle the problem of latency and bus traffic increase in a coherency control, there needs a means for generating a logical address from a physical address which is the technology disclosed in patent document 1, that is, a means such as physical-logical address Translation Look-aside Buffer 455 shown in FIG. 13, causing a different problem that the hardware volume becomes large.

Each component described in each above mentioned exemplary embodiment is not required to be independent, and it may be a structure such as one in which a plurality of components are realized as one module, one component is realized by a plurality of modules, a certain component is a part of another component, or a part of a certain component and a part of another component overlap each other.

Further, in each exemplary embodiment described above, a plurality of operations is not limited to be carried out at a different timing each other. For example, another operation may occur during execution of a certain operation, and the execution timing of a certain operation and a part or all of the execution timing of another operation may overlap.

Yet further, according to each exemplary embodiment described above, although a certain operation has been described such that it will be a trigger of another operation, the description does not intend to limit the entire relation between a certain operation and another operation. For this reason, when each exemplary embodiment is implemented, the relation between pluralities of operations can be changed within a range which does not pose a problem in terms of the content. The specific descriptions of each operation of each component are not intended to be limiting individual operation of each component. For this reason, when each exemplary embodiment is implemented, each specific operation of each component may be changed within a range that does not cause a problem in terms of function, performance and other characteristics.

Note that, if needed and possible, each component in each exemplary embodiment described above may be realized by hardware, by software, or by a mix of hardware and software.

In addition, the physical structure of each component is not limited to the description of the above mentioned exemplary embodiments, and it may exist independently, it may exist being combined or it may be constituted separately.

INDUSTRIAL APPLICABILITY

Each exemplary embodiment described above can be applied to such as a coherency control of a cache of hierarchical structures in a multiprocessor system.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The whole or part of the exemplary embodiments disclosed above can be described as, but not limited to, the following supplementary notes.

(Supplementary note 1) A coherency control system, comprising a logic-physical address translation means for translating a logical address including a first tag, an index address and an offset address of a first storage means of a set associative system into a physical address of a second storage means which includes a second tag, the index address and the offset address, a request output means for transmitting a load request including at least the physical address and a way number of a way to which an area of the first storage means designated by the logical address corresponding to the physical address belongs a correspondence state storing means for storing a relation state between an area of the second storage means and an area of the first storage means based on the way number included in the load request which has been received and the second tag and the index address of the physical address also included in the load request which has been received, and an invalidation instructing means for receiving a store request including the physical address, and transmitting an invalidation instruction including the index address and the way number based on the second tag of the physical address included in the store request which has been received and the relation state stored in the corresponding state storage means.

The invention claimed is:

1. A coherency control system, comprising:
a logical-physical address translation unit which translates a logical address including a first tag, an index address and an offset address of a first storage unit of a set associative system into a physical address of a second storage unit, the physical address including a second tag, the index address and the offset address;
a request output unit which transmits a load request including at least the physical address and a way number of a way to which an area of the first storage unit designated by the logical address corresponding to said physical address belongs;
a corresponding state storage unit which stores a relation state between an area of the second storage unit and an area of the first storage unit, when receiving the load request, by storing the second tag in the physical address included in the load request received, in the area designated based on the way number included in the load request and the index address of the physical address also included in the load request; and
an invalidation instructing unit which includes a command register which holds information indicating the load request or information indicating a store request, an address register which holds the physical address included in the load request or the store request, a way number register which holds the way number included in the load request, a decoder which outputs a load request signal or a store request signal and a determination circuit which performs comparative determination of the second tag of the physical address included in the store request and the second tag stored in the corresponding state storage unit, receives the store request including the physical address, and outputs, when detecting the second tag of the physical address included in said store request received and any of the second tags stored in the area corresponding to the index address of the physical address included in said store request among the second tags stored in the corresponding state storage unit are identical, the index address and an invalidation signal corresponding to the way number of the area, where the second tag detected as identical is stored, as an invalidation instruction.

2. The coherency control system according to claim 1, wherein
the corresponding state storage unit stores information indicating that an entry of the second storage unit is in an opened state in an entry flag which is selected based on the way number included in the load request, the index address of the physical address also included in the load request and a processor identifier which has transmitted said load request among a plurality of entry flags which are included in an address array provided in the second storage unit and which correspond to a combination of the index address, the way number and the processor identifier; and
the invalidation instructing unit outputs, when detecting that the second tag of the physical address included in the store request and the second tag that is stored in the corresponding state storage unit and that corresponds to an index address of the physical address included in said store request are identical, said index address and a way number corresponding to the entry flag storing information indicating that the entry of the second storage unit is in an opened state among entry flags corresponding to said second tag to the processor including the processor identifier corresponding to said entry flag as an invalidation instruction.

3. A coherency control apparatus, comprising:
a corresponding state storage unit which stores, when receiving the load request including a physical address of a second storage unit which is translated from a logical address including a first tag, an index address and an offset address of a first storage unit of a set associative system and which includes a second tag, the index address and the offset address and a way number of a way to which an area of the first storage unit designated by the logical address corresponding to said physical address belongs, a relation state between an area of the second storage unit and an area of the first storage unit by storing the second tag in the physical address included in the load request received into the area designated based on the way number included in said load request and the index address of the physical address also included in said load request; and an invalidation instructing unit which includes a command register which holds information indicating the load request or information indicating a store request, an address register which holds the physical address included in the load request or the store request, a way number register which holds the way number included in the load request, a decoder which outputs a load request signal or a store request signal and a determination circuit which performs comparative determination of the second tag of the physical address included in the store request and the second tag stored in the corresponding state storage unit, receives the store request including the physical address, and outputs, when detecting that the second tag of the physical address included in said store request received and any of the second tags stored in the area corresponding to the index address of the physical address included in said store request among the second tags stored in the corresponding state storage unit are identical, the index address and an invalidation signal corresponding to the way number of the area, where the second tag detected as identical is stored, as an invalidation instruction.

4. The coherency control apparatus according to claim 3, wherein the corresponding state storage unit stores information indicating that an entry of the second storage unit is in an opened state in an entry flag which is selected based on the way number included in the load request, the index address of the physical address also included in said load request and a processor identifier which has transmitted the load request among a plurality of entry flags which are included in an address array provided in the second storage unit and which correspond to a combination of the index address, the way number and the processor identifier; and the invalidation instructing unit outputs, when detecting that the second tag of the physical address included in the store request and the second tag that is stored in the corresponding state storage unit and that corresponds to an index address of the physical address included in said store request are identical, said index address and a way number corresponding to the entry flag storing information indicating that the entry of the second storage unit is in an opened state among entry flags corresponding to said second tag to the processor including the processor identifier corresponding to said entry flag as an invalidation instruction.

* * * * *